July 26, 1966 H. B. R. BOOSMAN 3,263,217
REMOTE CONTROL SYSTEM
Filed March 22, 1961
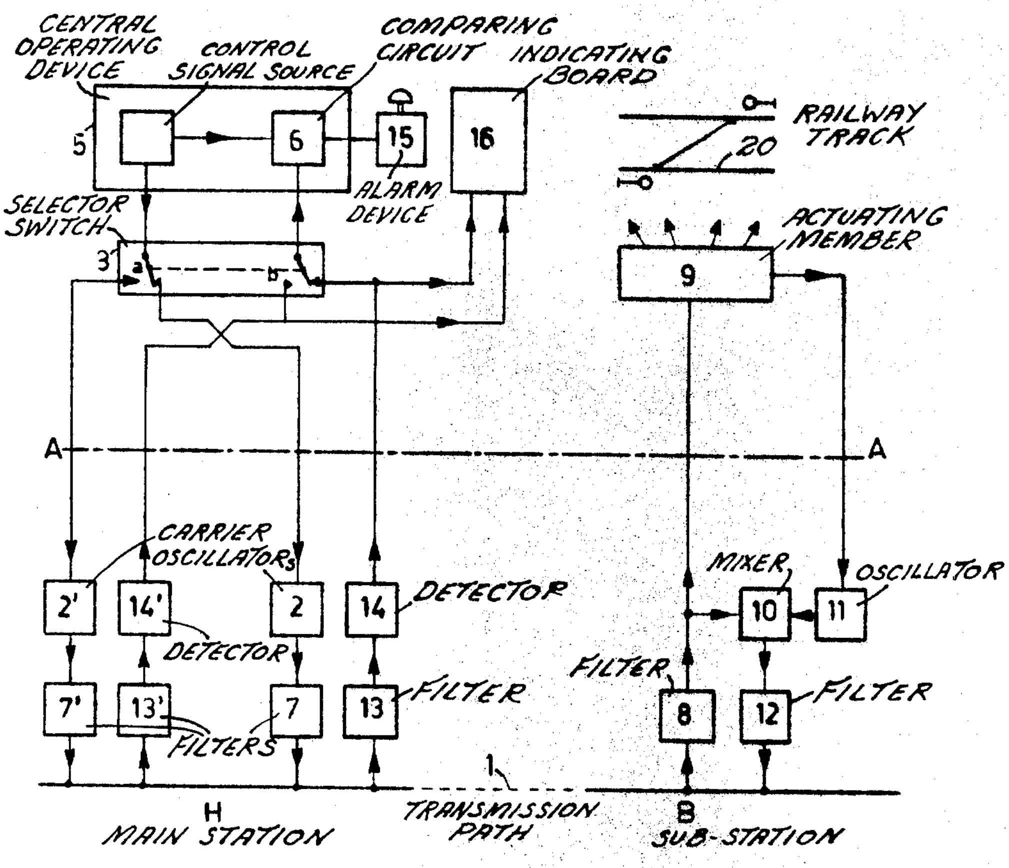
INVENTOR
HERMAN B. R. BOOSMAN.
BY [signature]
AGENT United States Patent Office 3,263,217
Patented July 26, 1966

3,263,217
REMOTE CONTROL SYSTEM

Herman Bernard Rudolf Boosman, Bunnink, Netherlands, assignor to North American Philips Company, Inc., New York, N.Y., a corporation of Delaware
Filed Mar. 22, 1961, Ser. No. 97,626
Claims priority, application Netherlands, Apr. 5, 1960, 250,153
1 Claim. (Cl. 340—163)

This invention relates to remote control systems of the type comprising a main station and a plurality of sub-stations connected to the same transmission path. The sub-stations may, for example, when used in the railway system, be employed to control pointers and signals.

In known systems of this kind, the main station comprises means for selectively transmitting coded command signals to the sub-stations. The command signals control switching operations in the sub-station, for example, pointers and signals may be brought into the desired positions. Subsequently, signals characteristic of the performed operations are transmitted by the sub-station to the main station where they are indicated, for example, on an indicator board.

In a known system in which the signals in the main station and in the relevant sub-station are memorized and in which the signal transmitted by the sub-station to the main station is compared in the main station with the information stored in the memory, an indication is given if the two informations are in agreement, as a sign that the command has been carried out correctly.

If the signal confirming that the command has been carried out is not forthcoming, or a signal is received which does not correspond to the relevant command, the cause may be attributable, when the equipment is used in the railway system, to a failure of the safety circuit, which may be ascertained on the indicator panel, or may be due to an interference. It is naturally desirable to localize such interference as quickly as possible and verify whether the fault occurs in the transmission of the signals, that is to say, in the transmission path or in the transmission equipment, or must be found in the operating member at a sub-station, that is to say, in the detection, decoding or the safety circuit. It is therefore important to verify whether the signals have properly arrived at the sub-station, or an interference has occurred in the transmission.

According to the invention, the signals received by the substation are not only transmitted to the command executing or actuating member for carrying out the command, but are also at the same time returned by the sub-station to the main station to be compared therein with the signal emanating from the main station. Alarm means may be actuated if the two informations are not in agreement.

Preferably, the signals passing from the main station to the substations are modulated on carrier oscillations having different frequencies for the various substations, each substation comprising an input filter corresponding to the characteristic frequency, together with a mixing stage in which the signals passed by the input filter are mixed with a locally-produced auxiliary oscillation having a frequency which is the same for all the substations and higher than the frequency of the said carrier oscillations, whereupon the signal is returned at the difference frequency to the main station.

In order that the invention may be readily carried into effect, one embodiment thereof will now be described in detail, by way of example, with reference to the accompanying diagrammatic drawing.

The figure shows a horizontal line A—A and below this line a transmission path 1 and the transmission equipment. Above the line A—A can be seen a part of the central operating device at a main station H and the actuating member at a substation B and part of a railway track 20 near this sub-station. One station B only is shown, the other stations being designed in a similar manner.

The main station H communicates with the substations, and conversely, with the aid of carrier waves modulated in frequency or in amplitude, dependently upon the signals to be transmitted, and having different frequencies for the various substations. The main station H for this purpose comprises a plurality of generators 2, 2′, etc., each of which continuously supplies to the transmission line a carrier oscillation having a frequency which is characteristic of the relevant substation.

By means of a selecting device such as selector switch 3, the operator at the main station H can select a given sub-station, for example B, to bring about therein certain switching operations to control, for example, pointers and signals. A control signal source 4 of a central operating device 5 is then connected through a contact *a* of the selecting device 3 to the oscillator 2, which can thus be supplied with signals. The signal source 4 is also connected to a comparing circuit 6.

The modulated oscillations from the oscillator 2 are transmitted through a transmitting filter 7 to the transmission path and filtered by a receiving filter 8 in the substation B. The frequency-modulated oscillation passes from the receiving filter 8 to an executive actuating member 9, wherein it is detected, possibly registered, decoded and, at last, operates the points and signals by way of a safety device. The output of filter 8 is also connected to a mixing stage 10, the other end of which is fed from an oscillator 11 having the same frequency at all the sub-stations. A signal of difference frequency is therefore produced in the mixing stage, and this signal is supplied through a transmitting filter 12 and the transmission path 1 to the corresponding receiving filter 13 at the main station, where it is detected there in a detector 14. The output of detector 14 is supplied through a contact *b* of the selecting device 3 to the comparing circuit 6 and compared therein with the control signal. If a deviation is found, an alarm device 15 is made operative. For a second sub-station, the transmission elements at the main station are indicated by the same reference numerals with prime marks.

If there are 12 substations, the characteristic carrier frequencies of these stations may be, for example, 420, 540, 660, . . . 1620 and 1740 c./s., adjacent frequencies thus differing from each other by 120 c./s. If the local generator 11 in each sub-station has a frequency of 3600 c./s., the frequencies of the signals returned from the sub-stations to the main station are respectively 3180, 3060, . . . 1980 and 1860 c./s. Consequently, each forward signal of a given frequency has associated with it a return signal of a corresponding characteristic frequency.

As previously mentioned, the command received by the sub-station B is carried out by the device 9. For confirming that the command has been carried out, the device 9 emits signals to the oscillator 11. Since the oscillator 2 at the main station continuously produces oscillations, the same return frequency results, but are now modulated in accordance with the returned signals. These signals, after having been filtered by the filter 13 and detected in the detector 14, are supplied to an indicator board 16.

If desired, it is also possible for the operating signal to be compared with the command signal, which for this purpose has been stored in a memory of the central operating device.

The device as described affords the additional advantage that if, for example, the sub-stations are continuously signalling back, this signalling may simply be stopped by supplying a signal coded in a predetermined manner to the generator 2. In the case of continuously back-signalling it is also desirable to provide an alarm upon dropping out of same.

On the other hand, dropping out of the oscillation frequency of the oscillator 2 at a sub-station may also be detected in order to prevent adjustments at a sub-station which must not be continued without contact with the main station.

What is claimed is:

A remote control system comprising a main station, a plurality of sub-stations, and common transmission path means extending between said main station and each of said sub-stations, said main station comprising a source of control signals, a plurality of sources of carrier oscillations of different frequency, means for selectively modulating said carrier oscillations, means for applying said modulated carrier oscillations to said transmission path means, each of said sub-station means comprising filter means connected to said transmission path for selecting a different carrier oscillation frequency, actuating means connected to the respective filter means for executing commands in response to said control signals, a source of auxiliary oscillations, means for modulating said auxiliary oscillations with the modulated carrier frequency output of said respective filter means independently of the execution of commands by said actuating means, and means for applying said modulated auxiliary oscillations to said transmission path means, said main station further comprising means for receiving and detecting said modulated auxiliary oscillations, means for comparing said control signal and detected modulated auxiliary oscillations, and alarm means responsive to differences between said control signal and detected modulated auxiliary oscillations.

References Cited by the Examiner

UNITED STATES PATENTS

| | | | |
|---|---|---|---|
| 2,242,196 | 5/1941 | Thompson et al. | 340—163 |
| 2,581,056 | 1/1952 | Walmsley et al. | 340—163 |
| 2,664,554 | 12/1953 | Doremus et al. | 340—163 |
| 2,790,965 | 4/1957 | Schenck | 340—163 |
| 2,794,117 | 5/1957 | Rees et al. | |
| 2,816,218 | 12/1957 | Rees et al. | |

NEIL C. READ, *Primary Examiner.*

A. J. KASPER, *Assistant Examiner.*